United States Patent
Hwang et al.

[11] Patent Number: 5,951,919
[45] Date of Patent: Sep. 14, 1999

[54] METHOD OF PREPARING CATHODE MATERIAL FOR LITHIUM ION CELL

[75] Inventors: Kang-Seon Hwang; Dong-Hwan Kim, both of Taejeon; Sung-Ruyl Kwon, Pusan, all of Rep. of Korea

[73] Assignee: Korea Kumho Petro Chemical Co., Ltd., Seoul, Rep. of Korea

[21] Appl. No.: 09/057,240

[22] Filed: Apr. 8, 1998

[30] Foreign Application Priority Data

Dec. 30, 1997 [KR] Rep. of Korea .................. 97-78204

[51] Int. Cl.[6] ................................................ H01B 1/08
[52] U.S. Cl. ........................... 252/518.1; 252/521.2; 252/519.1; 429/224; 429/223; 423/594; 423/599; 423/592
[58] Field of Search ..................... 252/518.1, 521.2, 252/519.2, 519.21, 519.3, 521.6; 423/594, 592, 599; 429/223, 224, 229, 218

[56] References Cited

U.S. PATENT DOCUMENTS 5,733,685  3/1998  Wang ........................... 429/224
5,788,943  8/1998  Aladjov ........................ 423/594

Primary Examiner—Mark Kopec
Assistant Examiner—Derrick G. Hamlin
Attorney, Agent, or Firm—Davidson, Davidson & Kappel, LLC

[57] ABSTRACT

Provided is a method of preparing a cathode material for lithium ion cell, which is designed to have the cycle characteristic enhanced and high initial discharge capacity, by synthesizing $LiMn_2O_4$ powder having a stable spinel structure, vigorously agitating the powder in an aqueous solution of Li and Ni ions, dispersing the solution through a supersonic wave treatment, filtering it so as for the powder to adsorb the ions, and performing a heat treatment for doping the ions.

5 Claims, 2 Drawing Sheets

A: EMBODIMENT 1
B: EMBODIMENT 2
C: EMBODIMENT 3
D: COMPARATIVE EXAMPLE 1
E: COMPARATIVE EXAMPLE 2
F: COMPARATIVE EXAMPLE 3
G: COMPARATIVE EXAMPLE 4
H: $LiMn_2O_4$

METHOD OF PREPARING CATHODE MATERIAL FOR LITHIUM ION CELL

BACKGROUND OF THE INVENTION

1. Field of the Invention

The present invention relates to a preparation of a cathode material for lithium ion cell and, more particularly, to a method of preparing a cathode material for lithium ion cell which is adequately used in miniaturized wireless devices such as camcorder, portable radiophone, notebook PC and the like with the cycle characteristic enhanced and a high initial discharge capacity.

2. Discussion of Related Art

With the rapid progress of electronic, communication and computer-related industries, miniaturized wireless devices, e.g., portable radiophones, notebook PCs, and so forth are recently in great demand and therefore more electrical cells are required to be used for these devices as a power source.

There are two types of cells in general; cells that have the durability only for a single use, and secondary cells reusable in succession by a charging and recently preferred in use.

Many studies and developments have been made on the secondary cells, especially, lithium ion cells which are reversible cells related to entrance and release of lithium ions and have a high voltage of 3–4 Volts with high energy density of 100 Wh/kg.

Lithium ion cells contain a separated plate which is disposed between the anode, cathode and cathode of carbon fiber to absorb and ionize the anode, current collector and Lithium ion and nonabsorbed electrolyte.

Lithium ion cells use an electrode material for cathode and cathode that provides reversible entrance/release of lithium ions during a charge/discharge. As for a cathode material, the oxides of transition metals of high cell potential, energy density and stability are very significant to use such as $LiCoO_2$, $LiNiO_2$ and $LiMn_2O_4$. One of these oxides of transition metals, $LiMn_2O_4$ has been considered to be the most useful material because of it is very inexpensive and causes no pollution to the environment relative to the other materials.

Particularly, lithium manganese oxide with a spinel structure which show a gentle discharge curve with high discharge potential and a slight self-discharge may be advantageous as a useful cathode active material in that they can be used in a wide range of operating temperature without causing pollution and produced from an abundant source.

Despite these advantages, there is a limit to spinel $LiMn_2O_4$ in using as a cathode active material because spinel $LiMn_2O_4$ has the discharge capacity decreased with the repeated charge/discharge cycles.

To overcome the problem, many studies have been made, for example, a method of repressing a rapid decrease in the discharge capacity according to the charge/discharge cycles by replacing Li or Mn in $LiMn_2O_4$ with other ions, raising another problem in that the initial discharge capacity is reduced [Reference: J. Electrochem. Soc., 138, 1991, 2859; J. Electrochem. Soc., 143, 1996, 3590; Solid State Ionics, 69, 1994, 59].

SUMMARY OF THE INVENTION

Accordingly, the present invention is directed to a method of preparing a cathode material for lithium ion cell that substantially obviates one or more of the problems due to limitations and disadvantages of the related art.

An object of the present invention is to provide a method of preparing a cathode material for lithium ion cell which is designed to have the cycle characteristic enhanced as well as high initial discharge capacity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of preparing a cathode material for lithium ion cell of the invention comprises the steps of: synthesizing $LiMn_2O_4$ powder having a stable spinel structure; preparing an aqueous ion solution containing lithium salt and nickel salt in the mole ratio of 1:1; blending the $LiMn_2O_4$ powder into the aqueous ion solution, agitating the solution and performing a supersonic wave treatment to disperse the solution; filtering the dispersed solution; and performing a heat treatment.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Figure 1:
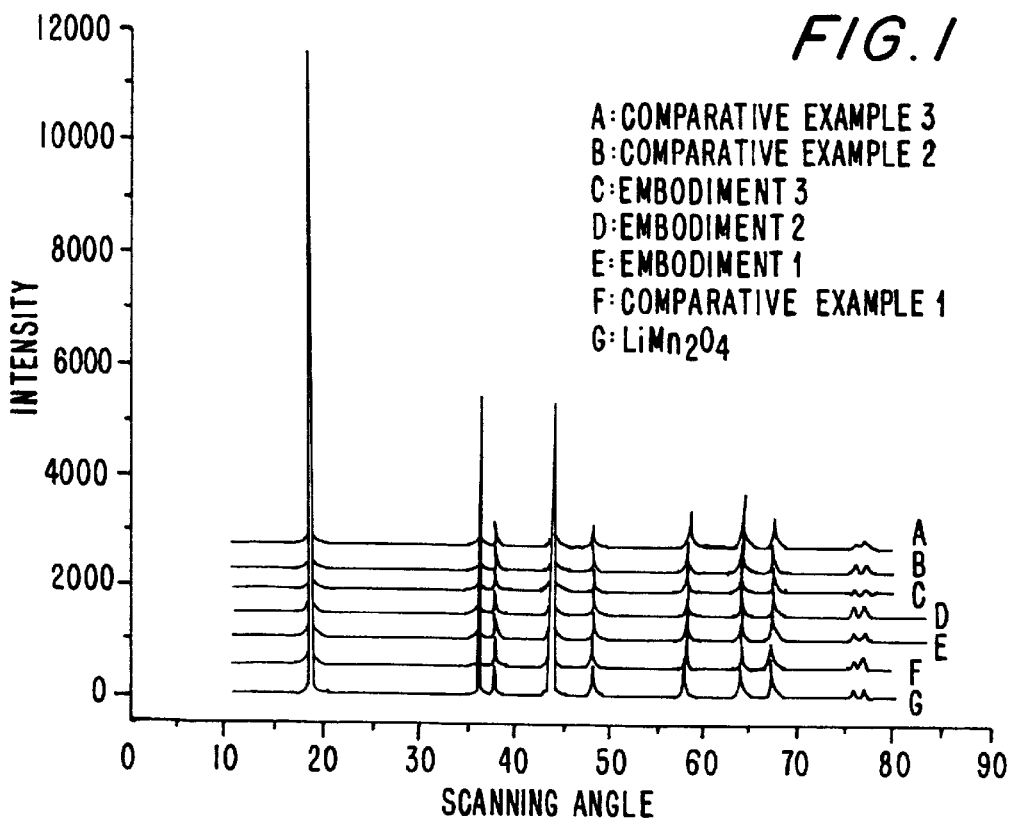
FIG. 1 is a graph showing the results of phase analysis by XRD (X-ray diffractometry) for cathode materials for lithium ion cell according to Embodiments 1 to 3 and Comparative Examples 1 to 3.

Reference will now be made in detail to the preferred embodiments of the present invention, examples of which are illustrated in the accompanying drawings.

There is first prepared $LiMn_2O_4$ powder having a stable spinel structure.

To synthesize $LiMn_2O_4$ powder, starting materials, $MnO_2$ and $Li_2Co_3$ are weighed in the mole ratio of 4:1, wet-milled for 24 hours and blended. The mixture is then subjected by a heat treatment at 800° C. for 12 hours, allowing a solid phase reaction to obtain a stable $LiMn_2O_4$ powder.

In preparing an aqueous solution separately from the powder, lithium and nickel salts are mixed in the mole ratio of 1:1.

The lithium salt is at least one selected from the group consisting of $LiNO_3$, $LiCl$, $LiCH_3CO_2$, $LiOH$ and $Li_2SO_4$, while the nickel salt is at least one selected from the group consisting of $Ni(NO_3)_2 \cdot 6H_2O$, $NiCl_2 \cdot xH_2O$, $Ni(CH_3CO_2)_2 \cdot 4H_2O$, $Ni(OH)_2$ and $NiSO_4 \cdot 4H_2O$.

The mixture of lithium and nickel salts is then dissolved in distilled water in the mole ratio of 1:1 to produce an aqueous ion solution. The concentration of this aqueous ion solution is preferably in the range of between 0.8 and 1.5M.

When the concentration of the aqueous ion solution is lower than 0.8M, neither cycle characteristic nor initial discharge capacity can be enhanced. If the concentration is above 1.5M, the aqueous ion solution has a decrease in both cycle characteristic and initial discharge capacity.

$LiMn_2O_4$ powder having a stable spinel structure is then blended into the aqueous ion solution, and the solution is agitated, treated with supersonic wave, and filtered so as for the powder to adsorb the aqueous ion solution.

The content of spinel $LiMn_2O_4$ in the aqueous ion solution is preferably 13 to 17 wt. % with respect to the total weight of the mixed solution.

The amount of ions adsorbed can be controlled by regulating the concentration of the aqueous ion solution.

Finally, $LiMn_2O_4$ powder adsorbing the ions is subjected by a heat treatment so that residual moisture and organisms in the adsorbed aqueous solution can be removed and lithium and nickel ions are doped.

It is preferable to carry out the heat treatment at a temperature between 600 and 800° C. for a defined hours; otherwise, the cycle characteristic will be adversely affected, for example, the residual organisms are not removed at below 600° C. while an unwanted phase is produced by a volatilization of $Li_2O$ at a temperature above 800° C.

Following examples are exemplary only and are not to be considered as limiting the scope of the invention.

Embodiment 1

$MnO_2$ and $Li_2CO_3$ are weighed in the mole ratio of 4:1, wet-milled for 24 hours and blended. The mixture is subjected by a heat treatment under the atmosphere at 800° C. for 12 hours, allowing a synthesis of spinel $LiMn_2O_4$.

$LiNO_3$ and $Ni(NO_3)_2 \cdot 6H_2O$ are then dissolved in distilled water to prepare a 0.8M aqueous ion solution.

After adding spinel $LiMn_2O_4$ of about 20 wt. % to the aqueous ion solution, the solution is vigorously agitated and subjected by a supersonic wave treatment to disperse the solution.

This uniformly dispersed solution is filtered so as for the powder to adsorb the solution and the powder is dried in an oven at 100° C. for 24 hours.

Dried powder is heat-treated at 700° C. for 2 hours to obtain a cathode material powder for lithium ion cell, which is used for the later charge/discharge tests.

Embodiments 2 and 3

These embodiments are performed according to the procedure of Embodiment 1 to prepare a cathode material powder for lithium ion cell except that the aqueous ion solutions are 1.0M and 1.5M in concentration in the Embodiments 2 and 3, respectively.

Comparative Examples 1 to 3

These examples are performed according to the procedure of Embodiment 1 to prepare a cathode material powder for lithium ion cell except that the aqueous ion solutions are 0.5M, 2.0M and 3.0M in concentration in the Examples 1 to 3, respectively.

Comparative Example 4

Refer to J. Electrochem. Soc., 143 (1996) 178, 138 (1991) 2859.

2 moles of $MnO_2$ and 0.5 moles of $Li_2CO_3$ are weighed, wet-milled for 24 hours and blended. The mixture is subjected by a heat treatment under the atmosphere at 800° C. for 12 hours, allowing a synthesis of $LiMn_2O_4$.

Next, 0.5 moles of $Li_2CO_3$, 1.9 moles of $MnO_2$ and 0.1 mole of $Ni(NO_3)_2 \cdot 6H_2O$ are weighed, wet-milled for 24 hours and blended. This mixture is subjected by a heat treatment under the atmosphere at 800° C. for 12 hours to obtain $Li[Mn_{1.9}Ni_{0.1}]O_4$ powder.

Experimental Example

Cathode materials for lithium ion cell of 93 wt. % prepared according to the above Embodiments and Comparative Examples, carbon black 5 wt. % as a conductive material, and PVDF (PolyVinylidiene Fluoride, MW=530, 000) in 1-methyl-2-pyrollidinon 2 wt. % as a bonding agent are weighed and wet-milled for 24 hours, thus obtaining a slurry for coating an electrode.

To prepare an electrode for use in the later charge/discharge test, an current-collecting aluminum plate is coated on its both sides with the slurry of 1 cm×1 cm. dried for 24 hours and compressed with a compressor.

An half-cell is made in a globe box under the Ar atmosphere in order to determine the charge/discharge property of the electrode.

Electrolyte used is 1M solution of $LiPF_6$ dissolved in ethylene carbonate/dimethylcarbonate (1:1), and Li plate is used for reference and opposite electrodes.

Experiments in constant current are then performed under the conditions of current density C/5, charging upper threshold voltage 4.3 V and discharging lower threshold voltage 3.0 V.

Under these conditions, charge/discharge tests are performed up to 100 cycles by using a charging/discharging device manufactured in Toyo system.

Figure 3:
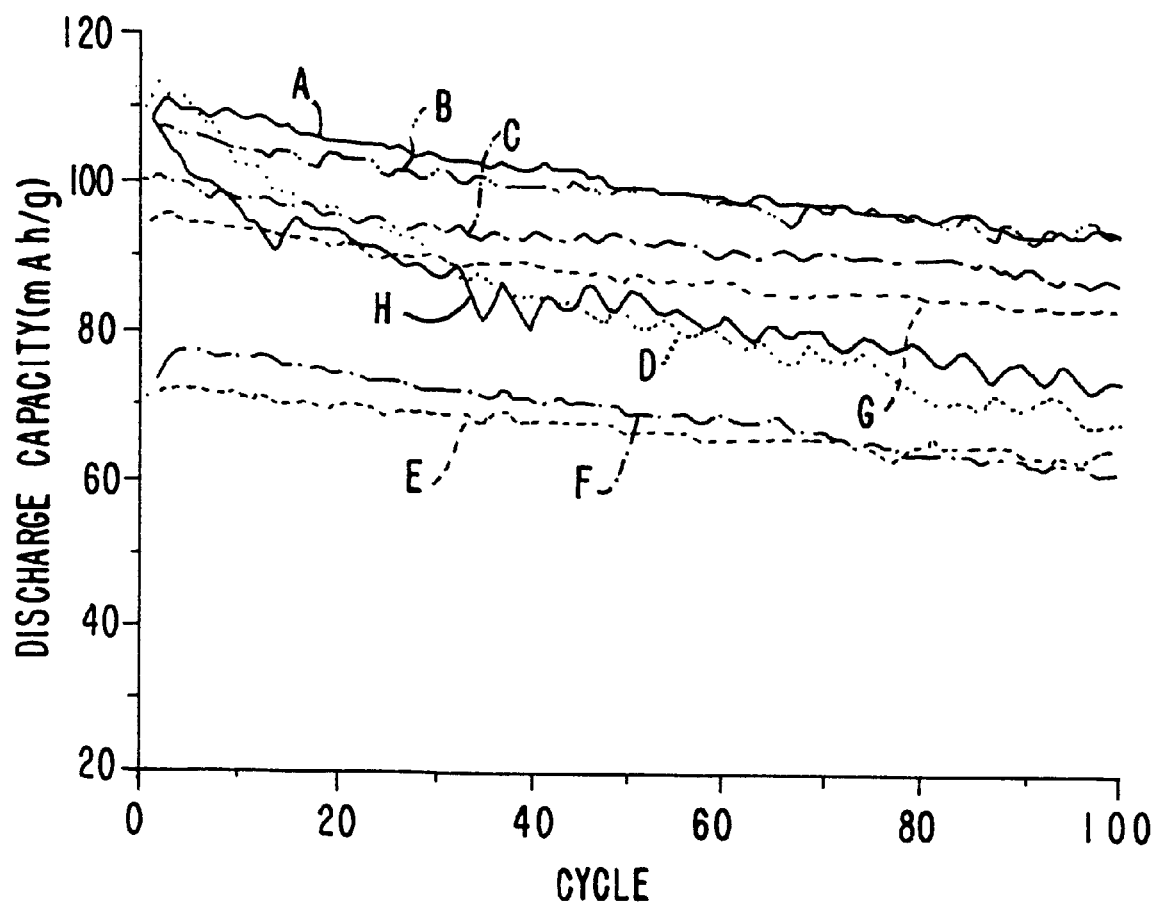
FIG. 3 is a graph showing the changes in the discharge capacity over the cycle of the cathode materials for lithium ion cell prepared according to Embodiments 1 to 3 and Comparative Examples 1 to 4.

Results are shown in Test 1 and FIG. 3.

On the other hand, the cathode materials for lithium ion cell prepared according to the above Embodiments and Comparative Examples, and undoped $LiMn_2O_4$ are phase-analyzed through XRD (X-Ray Diffractometry). Results are shown in FIG. 1.

Figure 2:
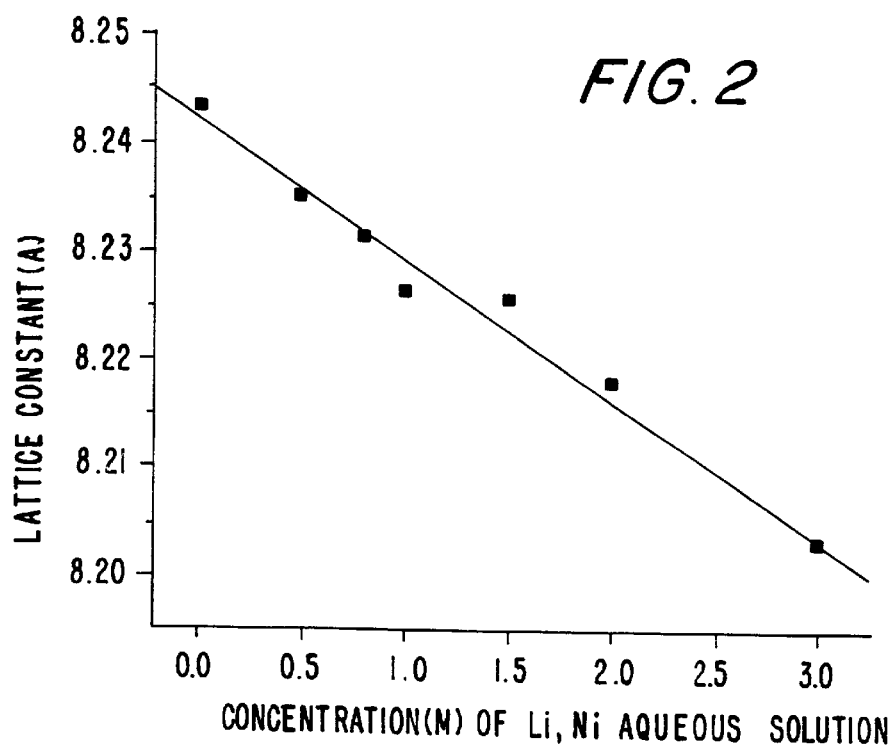
FIG. 2 is a graph plotting the lattice constant of each cathode material for lithium ion cell over the concentration of an aqueous solution containing lithium and nickel salts.

Based on the results in FIG. 1, the lattice constant of each powder according to the concentration of the aqueous ion solution can be calculated by Nelson-Wiely equation and plotted in FIG. 2.

TABLE 1

| DIV. | | INITIAL DISCHARGE CAPACITY (mhA/g) | 100TH DISCHARGE CAPACITY (mhA/g) | DECREASE RATE OF DISCHARGE CAPACITY (%) 4) |
|---|---|---|---|---|
| 1) | 1 | 111 | 93 | −16.2 |
|  | 2 | 108 | 96 | −11.11 |
|  | 3 | 101 | 87 | −13.86 |
| 2) | 1 | 112 | 68 | −39.29 |
|  | 2 | 73 | 64 | −12.33 |
|  | 3 | 75 | 61 | −18.67 |
|  | 4 | 96 | 84 | −12.5 |
| 3) |  | 108 | 74 | −31.48 |

NOTE:
1) EMBODIMENTS
2) COMPARATIVE EMBODIMENTS
3) SPINEL $LiMn_2O_4$
4) DECREASE RATE OF DISCHARGE CAPACITY IS CALCULATED BY: (100TH DISCHARGE CAPACITY − INITIAL DISCHARGE CAPACITY)/INITIAL DISCHARGE CAPACITY × 100

FIG. 1 shows that all powders have a single spinel structure and FIG. 2 reveals that the lattice constant decreases with increasing concentration of the adsorbed aqueous solution. This is because the amounts of adsorbed Li and Ni ions are increased with the concentration of the aqueous ion solution.

As shown in Table 1 and FIG. 3, $Li[Mn_{1.9}Ni_{0.1}]O_4$ prepared by the conventional doping process (in Comparative Example 4) has the initial discharge capacity of 96 mAh/g and the 100th discharge capacity of 84 mAh/g.

The maintaining rate of discharge capacity is 85%, that is, 100th discharge capacity is 85% of the initial discharge capacity. This value is very high relative to the maintaining rate of discharge capacity of undoped spinel $LiMn_2O_4$. It is thus considered that the decrease in the discharge capapcity over the cycles can be dramatically inhibited.

As for cathode materials for lithium ion cell prepared by the conventional doping process (in Comparative Example 4), the initial discharge capacity is 96 mAh/g and it is undesirably greatly decrease by 13% compared with undoped spinel $LiMn_2O_4$.

Contrary to this, a cathode material for lithium ion cell prepared by the present doping process, for example, doped powder in 0.5M aqueous ion solution (in Comparative Example 1) has the initial discharge capacity 112 mAh/g and the 100th discharge capacity 68 mAh/g.

The cathode material of the present invention is has the discharge capacity characteristic similar to undoped spinel $LiMn_2O_4$. This would be because the concentration of the aqueous ion solution is extremely low with consequence of causing insufficient adsorption of ions or the powder cannot adsorb the ions sufficiently.

Doped powder in 0.8M aqueous ion solution (in Embodiment 1) has the initial discharge capacity 111 mAh/g and the 100th discharge capacity 93 mAh/g. Compared with powders prepared by the conventional doping process, the decrease rate is slightly enhanced only by about 4% but the initial capacity is greatly increased by 16%.

Doped powder in 1.0 M aqueous ion solution (in Embodiment 2) has the initial discharge capacity 108 mAh/g and the 100th discharge capacity 96 mAh/g. Compared with powders prepared by Comparative Example 4, the decrease rate is similar but the initial capacity is greatly increased by 13% or so.

Doped powder in 1.5M aqueous ion solution (in Embodiment 3) has the initial discharge capacity 101 mAh/g and the 100th discharge capacity 87 mAh/g. Compared with powders prepared by Comparative Example 4, the decrease rate is similar but the initial capacity is increased by about 5%.

Where the aqueous ion solution has a high concentration, e.g., 2.0M (in Comparative Example 2) or 3.0M (in Comparative Example 3), the decrease rate of discharge capacity is similar to the powder in Comparative Example 4 while the initial discharge capacity is greatly reduced by about 25%.

It is thus concluded that the cycle characteristic can be enhanced with high initial discharge capacity when using a cathode material for lithium ion cell prepared by dispersing $LiMn_2O_4$ in an aqueous solution containing Li and Ni ions in the 0.8 to 1.5M range of concentration, filtering the solution so as for the power to adsorb these ions, and performing a heat treatment for doping the ions.

As described above, the cathode material for lithium ion cell according to the present invention which is designed to have the cycle characteristic enhanced and high initial discharge capacity can be prepared by synthesizing $LiMn_2O_4$ powder having a stable spinel structure, vigorously agitating the powder in an aqueous solution of Li and Ni ions, dispersing the solution through a supersonic wave treatment, filtering it so as for the powder to adsorb the ions, and performing a heat treatment for doping the ions. Lithium ion cells can be manufactured at low production cost by using the novel cathode material for lithium ion cell instead of the conventional cathode material.

It will be apparent to those skilled in the art that various modifications and variations can be made in the preparation of a cathode material for lithium ion cell according to the present invention without departing from the spirit or scope of the invention. Thus, it is intended that the present invention cover the modifications and variations of this invention provided they come within the scope of the appended claims and their equivalents.

What is claimed is:

1. A method of preparing a cathode material for lithium ion cell, comprising the steps of:

synthesizing $LiMn_2O_4$ powder having a stable spinel structure;

preparing an aqueous ion solution containing lithium salt and nickel salt in the mole ratio of 1:1;

blending the $LiMn_2O_4$ powder into the aqueous ion solution, agitating the solution and performing a supersonic wave treatment to disperse the solution;

filtering the dispersed solution; and performing a heat treatment to dope the $LiMn_2O_4$ with nickel and lithium ions.

2. The method as defined in claim 1, wherein the lithium salt is at least one selected from the group consisting of $LiNO_3$, $LiCl$, $LiCH_3CO_2$, $LiOH$ and $Li_2SO_4$.

3. The method as defined in claim 1, wherein the nickel salt is at least one selected from the group consisting of $Ni(NO_3)_2 \cdot 6H_2O$, $NiCl_2 \cdot xH_2O$, $Ni(CH_3CO_2)_2 \cdot 4H_2O$, $Ni(OH)_2$ and $NiSO_4 \cdot 4H_2O$.

4. The method as defined in claim 1, wherein the aqueous ion solution is prepared in the 0.8 to 1.5 M range of concentration.

5. The method as defined in claim 1, wherein the heat treatment is performed at a temperature between 600 and 800° C.

* * * * *